United States Patent [19]

Ostwald

[11] Patent Number: 5,421,697
[45] Date of Patent: Jun. 6, 1995

[54] TELESCOPIC PICK-AND-PLACE ROBOTIC MECHANISM

[75] Inventor: Timothy C. Ostwald, Louisville, Colo.

[73] Assignee: Storage Technology Corporation, Louisville, Colo.

[21] Appl. No.: 25,251

[22] Filed: Mar. 2, 1993

[51] Int. Cl.$^6$ ............................................. B65G 63/00
[52] U.S. Cl. .................................. 414/753; 74/50; 294/115; 414/744.1; 901/38; 901/39
[58] Field of Search ............ 414/749, 751, 753, 744.1, 414/744.5; 901/38, 39, 31; 294/86.4, 106, 115; 74/48, 55, 50, 49, 30

[56] References Cited

U.S. PATENT DOCUMENTS

| | | | |
|---|---|---|---|
| 4,690,602 | 9/1987 | Castaldi et al. | 414/751 X |
| 4,864,511 | 9/1989 | Moy et al. | 364/478 |
| 4,908,777 | 3/1990 | Wolfe | 364/513 |
| 4,928,245 | 5/1990 | Moy et al. | 364/513 |
| 4,932,276 | 6/1990 | Treadwell et al. | 74/30 X |
| 4,932,826 | 6/1990 | Moy et al. | 414/277 |
| 4,939,944 | 7/1990 | Hou | 74/50 X |
| 5,034,904 | 7/1991 | Moy | 364/571.04 |
| 5,242,259 | 9/1993 | Yeakley | 294/86.4 X |
| 5,275,064 | 1/1994 | Hobbs | 414/749 X |

*Primary Examiner*—Donald W. Underwood
*Attorney, Agent, or Firm*—Sterne, Kessler, Goldstein & Fox

[57] ABSTRACT

A telescopic pick-and-place robotic mechanism used to retrieve and deposit magnetic tape cartridges from a remote position, configured to be mounted to a typical robotic assembly located in proximity of a storage area for computer data or other storage media. The present invention has a reduced cross-sectional area due to its telescopic nature.

The pick-and-place mechanism includes a base connected to the robotic arm and a number of slider plates coupled to the base which telescopically extend and retract relative to the base in a single axis of movement to reach the remote location. The slider plates are coupled to each other by slider means for enabling each of the slider plates to translate relative to each other along the single axis of movement. Each slider plate is controlled by a crank and slider mechanism which converts a incoming rotational force to a linear force in the direction of the single axis of movement. The mechanism is driven by a servo motor which is coupled to the base and outputs the necessary rotational force. A gripper mechanism is connected to at least one of the slider plates holds and releases the cartridge translates it on and off mechanism.

14 Claims, 11 Drawing Sheets

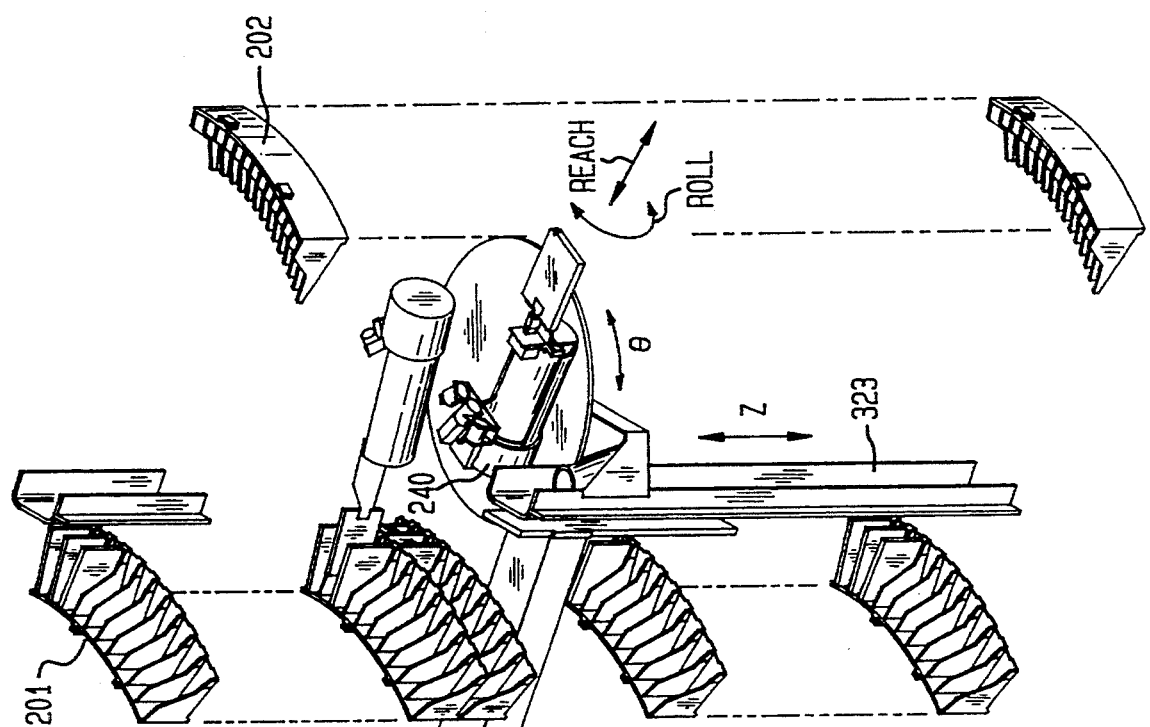
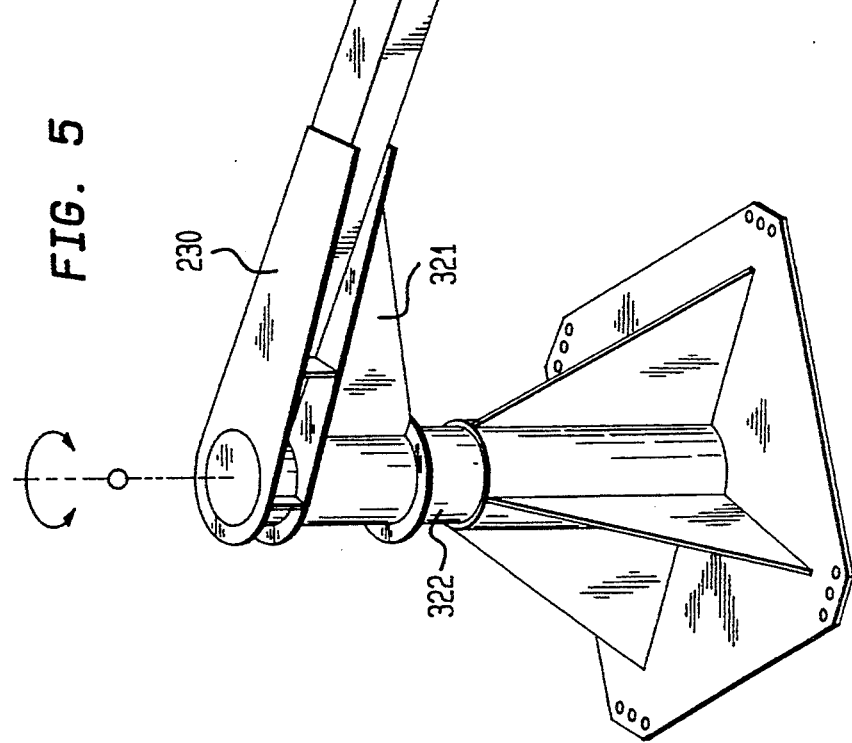
FIG. 5

TELESCOPIC PICK-AND-PLACE ROBOTIC MECHANISM

BACKGROUND OF THE INVENTION

1. Field of the Invention

This invention relates generally to robot arm systems and, more particularly, to robotic arm pick-and-place mechanisms.

2. Related Art

Robotic storage libraries for computer data have been designed to provide automated dam storage and retrieval at a reasonable cost. One of the characteristics of the storage library which affect this overall cost is storage capacity; that is, dollars per gigabytes stored. The storage capacity is influenced by the size of the media storage device, robotic hardware, and electrical support devices. One of the more considerable contributors to the overall storage capacity is the size of the operating envelope of the pick-and-place mechanism used to retrieve and replace the objects, typically computer tape cartridges, from the their stored position. This is because the pick-and-place mechanism is essentially added to the volume of each media storage device since the pick-and-place mechanism must be swept through its path of travel and be positioned to access each storage cell position.

Conventional robotic pick-and-place mechanisms have utilized a gripper mechanism to grab onto the magnetic tape cartridge, and a slider mechanism to convey the gripped magnetic tape cartridge into or out of the pick-and-place mechanism. This configuration requires a large operating envelope due to the use of two separate mechanisms, the gripper mechanism and the slider mechanism, to retrieve and replace the magnetic tape cartridge, with each having an associated servo system to control the motions of the mechanism. This results in a pick-and-place mechanism having a large design envelope which impacts the storage density of the storage library. Typically, the storage density of storage library systems using conventional pick-and-place mechanisms is approximately 63 cartridges per square foot.

What is needed is a robotic pick-and-place mechanism which has a minimal operating envelope, thereby increasing the overall storage density of the storage library. The size of this operating envelope is dependent upon the size of the object that the robotic pick-and-place mechanism is designed to retrieve and deposit. Since the magnetic tape cartridge will require a certain amount of area in order to be properly positioned for placement in a target device, the ideal robotic pick-and-place mechanism will have an operating envelope the same as or smaller than this area.

The robotic pick-and-place mechanism must be configured to adapt easily to presently available robotic arm assemblies. In addition, the reduced size and operating envelope of the robotic pick-and-place mechanism must not interfere with the accuracy, speed, or other functional capabilities of the pick-and-place mechanism.

SUMMARY OF THE INVENTION

The present invention is a telescopic robotic pick-and-place mechanism used for retrieving and replacing magnetic tape cartridges. The present invention has a cross-sectional area substantially equivalent to the area taken up by a magnetic tape cartridge when it is rotated through 360 degrees about its shortest axis. The present invention is configured to be mounted to a typical robotic assembly located in proximity to a storage area for computer data or other storage media.

The pick-and-place mechanism includes a base connected to the robotic arm and a number of slider plates coupled to the base which telescopically extend and retract relative to the base in a single axis of movement to reach a remote location. The slider plates are coupled to each other by slider means for enabling each of the slider plates to translate relative to each other on a single axis. Each slider plate is controlled by a crank and slider mechanism which converts an incoming rotational force to a linear force in the direction of the single axis of movement. The pick and place mechanism is driven by a driver means which is coupled to the base and outputs the necessary rotational force to extend and retract the slider plates. A gripper mechanism connected to at least one of the slider plates is also included. The gripper mechanism holds and releases the magnetic tape cartridge and translates it onto and off of the pick and place mechanism. This enables the pick-and-place mechanism of the present invention to operate with a single driver means to perform the gripping and sliding functions, thereby reducing its operating envelope and weight.

Further features and advantages of the present invention, as well as the structure and operation of various embodiments of the present invention, are described in detail below with reference to the accompanying drawings. In the drawings, like reference numbers indicate identical or functionally similarly elements. Additionally, the left-most digit of a reference number identifies the drawing in which the reference number first appears.

BRIEF DESCRIPTION OF THE DRAWINGS

The present invention will be described with reference to the accompanying drawings, wherein:

FIG. 5 is a perspective view of the robotic arm assembly;

DETAILED DESCRIPTION OF THE PREFERRED EMBODIMENTS

I. System Overview

Figure 1:
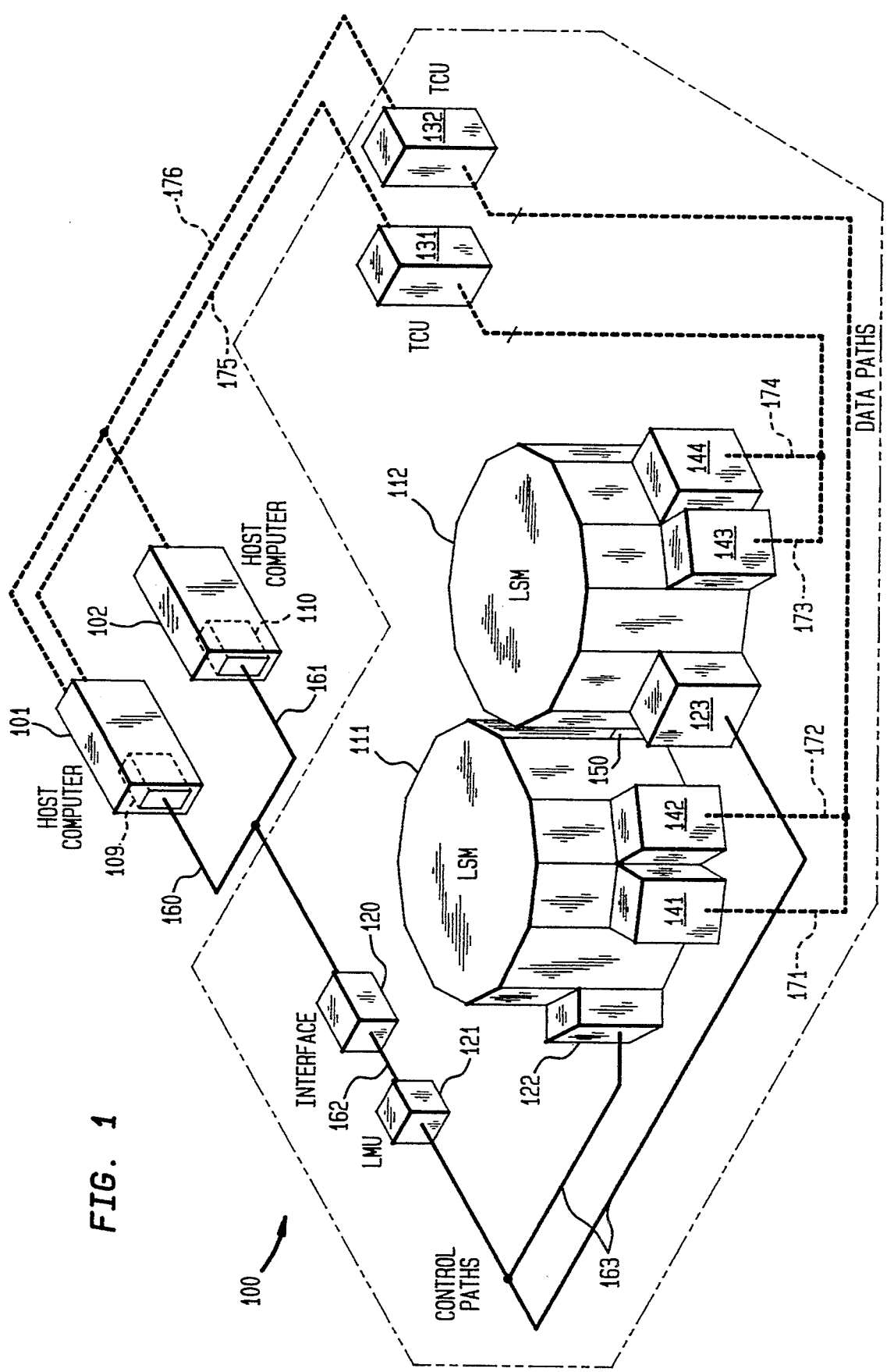
FIG. 1 is a block diagram of the automated magnetic tape cartridge library system.

Referring to FIG. 1, a block diagram of an automated data storage media cartridge library system 100 utilizing the present invention is illustrated. The automated data storage media cartridge library system ("Library System") 100 is implemented in the Automated Cartridge System (ACS), manufactured by Storage Technology Corporation, Louisville, Colo., U.S.A., and is fully described in U.S. Pat. Nos. 4,864,511 and 4,928,245 to Moy et al., incorporated herein by reference in their entirety. A plurality of host computers 101,102 are shown connected to the automated data storage media library system 100 by means of two types of paths: control paths (illustrated by solid lines) and data paths (illustrated by dashed lines). Control paths 160, 161 and data paths 175, 176 are described in more detail below. A plurality (up to 16) of host computers can be interconnected to the automated data storage media cartridge library system 100, but only two host computers 101 and 102 are illustrated for simplicity.

The library system 100 consists of a plurality of elements. Among these elements are included two automated data storage media cartridge library modules ("library modules") 111 and 112. Library modules 111 and 112 each store a plurality of data storage media cartridges (not shown), such as 18 track magnetic tape cartridges of the IBM 3480 type for use by host computers 101, 102. Automated data storage media cartridge library system 100 may contain up to 16 library modules, but only two library modules 111 and 112 are illustrated for simplicity.

Each of the library modules 111 and 112 stores up to 6,000 of the data storage media cartridges and contains a robot arm system that functions to retrieve and return the data storage media cartridges from media cartridge storage cells contained in the library module. After retrieving the data storage media cartridges, the robot arm system loads the cartridges on media drive systems shown in FIG. 1 as a plurality of elements 141–144 attached to each of library modules 111, 112.

In the preferred embodiment, the invention is implemented in the environment of a library system which stores information on magnetic tape media in a cartridge format. However, as would be apparent to a person skilled in the relevant art, any type of storage media may be used in the present invention (for example, magnetic disk, optical disk, optical tape, etc.). In addition, in the preferred embodiment of the present invention, media drive systems 141–144 are half-inch tape cartridge drives compatible with IBM 3480 computer systems such as STK 4480 tape drives, manufactured by Storage Technology Corporation, Louisville, Colo., U.S.A.. However, it should be understood that any corresponding media drive can be used to embody this invention. In addition, multiple types of information storage volumes and corresponding media drives may be used in the library system 100.

A system of control elements 120, 121,122, and 123 are illustrated in FIG. 1 connected between host computers 101, 102 and each library module 111 and 112. The control elements illustrated in FIG. 1 operate to control the robot arm mechanism in each of the library modules 111 and 112. Each of these control elements will be described in detail below with reference to the overall operation of the library system 100. In the discussion below, reference to a single host computer, host computer 101 will be discussed for simplicity. In operation, a user operating host computer 101 requests access to data stored in a designated magnetic tape cartridge which is stored in, for example, library module 111. Host computer 101 translates the request for this data into an operator console tape mount request message. Tape cartridge library software 109 and 110 reside on host computers 101 and 102, respectively. Tape cartridge library software 109 and 110 function to interface the library system 100 in transparent fashion to host computers 101 and 102. In the present example, this function is accomplished by tape cartridge library software 109 which traps operator console messages from host computer 101 and converts these console messages into magnetic tape cartridge retrieval commands. These magnetic tape cartridge retrieval commands are then transmitted via control path 162 to library management unit (LMU) 121 through interface unit 120.

Tape cartridge library software 109 contains a database that provides the translation between magnetic tape cartridge volume records and the tape mount request operator console messages from host computer 101. Thus, a data retrieval request from host computer 101 is intercepted by tape cartridge library software 109 and used to scan the tape volume records to identify the exact physical location of the requested magnetic tape cartridge. Tape cartridge library software 109 determines the exact physical location of the requested magnetic tape cartridge in one of the library modules 111 and 112, the availability of one of the tape drives 141–144, and the identity of the library module that contains the requested magnetic tape cartridge. Tape cartridge library software 109 then transmits control signals over control path 160 via interface control unit 120 and data link 162 to library management unit 121 to identify the location of the requested magnetic tape cartridge and the exact location of the destination tape drive.

Library management unit 121 responds to the control signals from tape cartridge library software 109 by determining a path assignment from the tape cartridge storage cell which contains the requested magnetic tape cartridge to the designated tape drive. In this example, the requested magnetic tape cartridge is library module 111, and the selective cartridge tape drive unit is tape drive 144, which is attached to library module 112. The library management unit 121 designates all of the functional steps to be taken by library modules 111 and 112 to effectuate the transfer of the requested magnetic tape cartridge from the tape cartridge storage cell located in library module 111 to the selected tape drive unit 144 located on library module 112. These control signals are transmitted via control paths 160–163 to library control units 122 and 123.

Library management unit 121 transmits control signals over control path 163 to library control unit 122 to identify the exact physical location of the requested magnetic tape cartridge. The robot arm mechanism in library module 111 is controlled by library control unit 122 which translates the control signals received from library management unit 121 into servo control signals to regulate the operation of the various servo systems of the robot arm mechanism in library module 111. Library control unit 122 causes the robot arm in library module 111 to retrieve or return the requested magnetic tape cartridge from a specific tape cartridge storage cell or media drive system in library module 111.

The retrieved magnetic tape cartridge may be transported by the robot arm in library module 111 to library module 112 by way of a pass-thru port 150. The pass-thru port 150 is a mechanism that interconnects two library modules and enables adjacent library modules to pass retrieved magnetic tape cartridges back and forth between the library modules for loading on a designated tape drive or for returning to the tape cartridge storage array.

In response to control signals from library control unit 122, the pass-thru port mechanism 150 interconnects library module 111 with library module 112. The robot arm mechanism in library module 111, in response to the control signals from library control unit 122, places the retrieved magnetic tape cartridge in the reserved slot of pass-thru port mechanism 150. Upon the completion of the tape retrieval operation by library module 111, library management unit 121 transmits control signals on control path 163 to library control unit 122 to activate pass-thru port mechanism 150. The control signals instruct pass-thru port mechanism 150 to transport the retrieved magnetic tape cartridge to face the robot arm mechanism in library module 112. Library management unit 121 then transmits control signals on control path 163 to library control unit 123. Library control unit 123 responds to these control signals by generating servo control signals to regulate the operation of the robot arm mechanism. These control signals cause the robot arm mechanism in library module 112 to retrieve the magnetic tape cartridge placed in pass-thru port mechanism 150 by the robot arm in library module 111. The magnetic tape cartridge is then placed by the robot arm in the tape drive 144 as designated by library management unit 121.

The library system 100 contains independent data paths which are isolated from the control paths described above. The components which are associated with the reading and transmitting of data from the library modules 111 and 112 to the host computers 101 and 102 include tape drive units 141–144, data paths 171–174, tape control units (TCUs) 131,132 and data links 175, 176. Each of these components will be described in detail below with reference to the data retrieval and transmission operation of the library system 100.

In the example above, the retrieved magnetic tape cartridge is loaded onto tape drive 144 where it is read in the usual fashion. Tape drive 144 then transmits the data on data path 174 to tape control unit 131. The data from tape drives 143 and 144 are multiplexed together in tape control unit 131 and transmitted over data link 175 to host computers 101 and 102. The data from tape drives 141 and 142 are multiplexed together in tape control unit 132 and transmitted over data link 176 to host computers 101 and 102. Thus, the data which is read from the retrieved magnetic tape cartridge and tape drive 144 are transmitted from tape drive 144 through tape control unit 131 to host computer 101 without the library modules 111 and 112 being aware of the destination of data.

In this fashion, a data retrieval request from a host computer is translated into the identification of a designated magnetic tape cartridge. This magnetic tape cartridge is automatically retrieved from its storage rack and transported to a library module that contains an available tape drive. That library module then loads the retrieved magnetic tape cartridge into the tape drive where it can be read and the data transmitted to the requesting host computer.

II. Library Module

A. Library Module Structure

Figure 2:
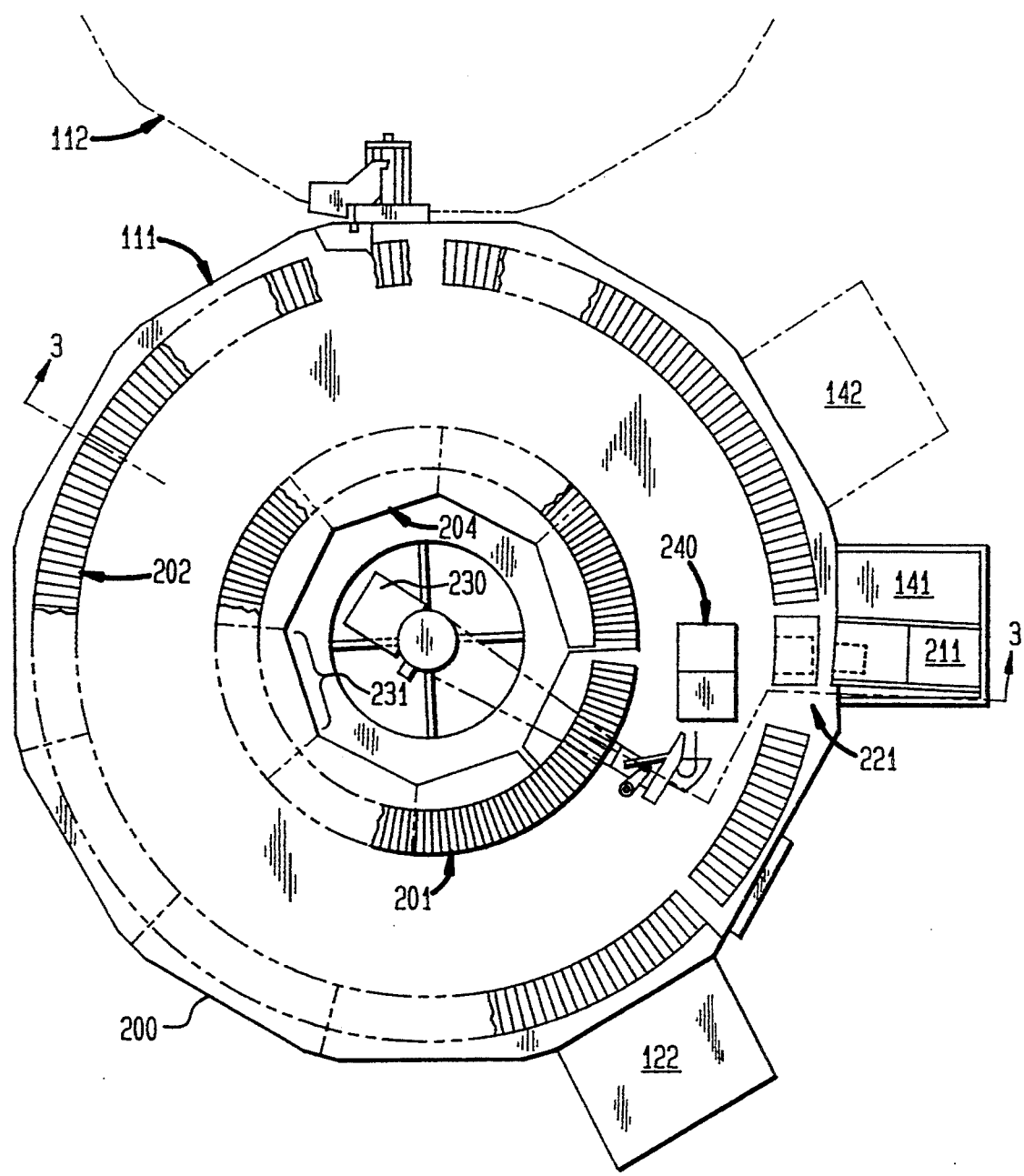
FIG. 2 is a top view of the automated tape cartridge library module.
Figure 3:
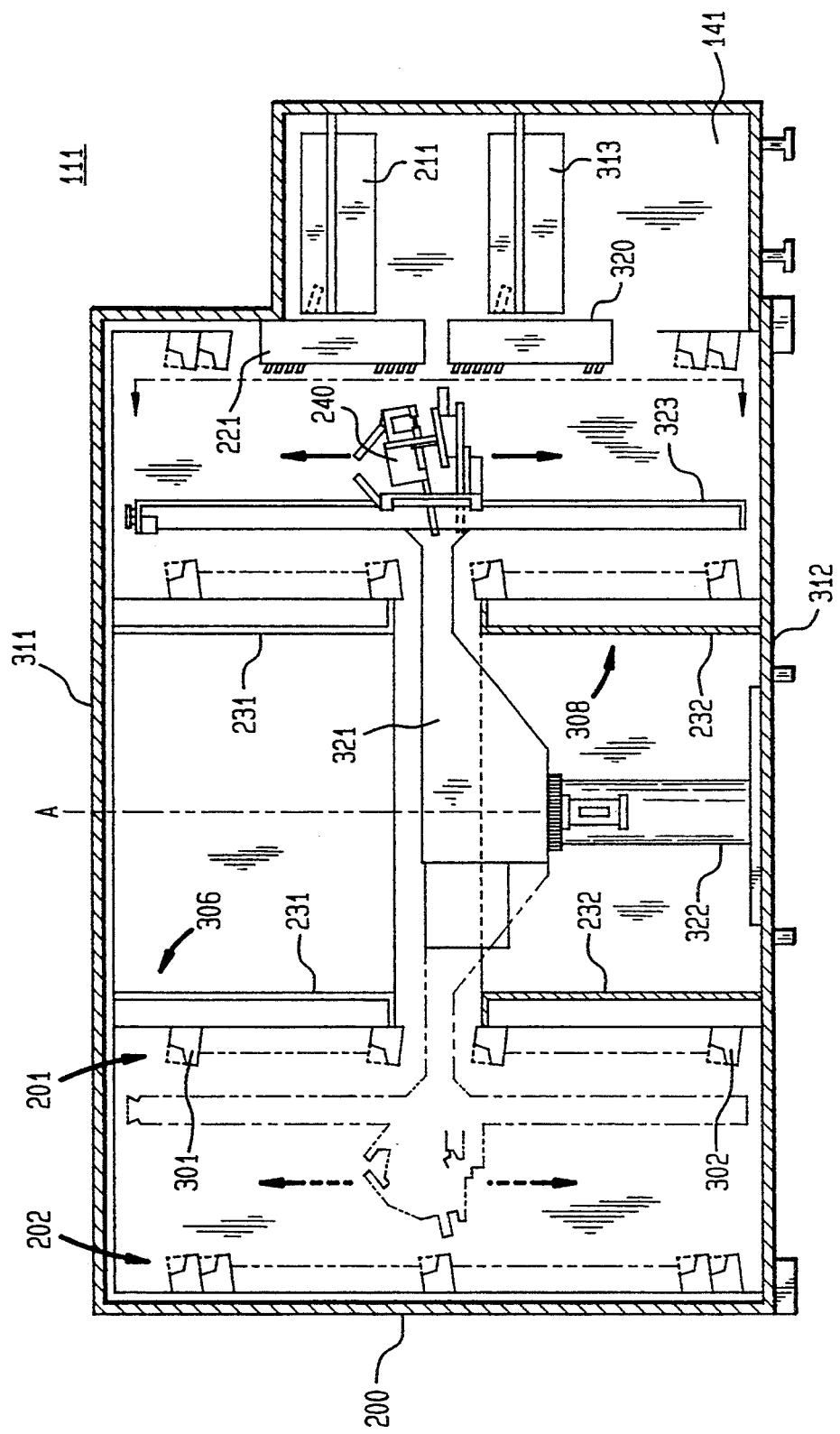
FIG. 3 is a cut away side view of the library module with its associated robotic arm assembly and tape cartridge storage array.

Referring to FIG. 2, a top view of library module 111 utilizing the present invention is illustrated. FIG. 3 illustrates a cut away side perspective view of the library module 111. The library module 111 is comprised generally of an exterior housing 200 which includes a plurality of wall segments 221 attached to floor plate 312 and ceiling plate 311, and disposed about a vertical axis A. Library module 111 also contains an inner wall 204 having an upper portion 306 which is suspended from ceiling plate 311 and a lower portion 308 which is mounted upon floor plate 312. The upper portion 306 is comprised of a plurality of upper segments 231 and the lower portion 308 is comprised of a plurality of lower segments 232.

The upper portion 306 and the lower portion 308 of inner wall 204 support an internal cylindrical array 201 of tape cartridge storage cells centered about the vertical axis A. An external cylindrical array 202 of tape cartridge storage cells is concentrically arranged about the internal cylindrical array 201 and mounted on the wall segments 221 of the exterior housing 200. The twelve-sided arrangement of the library modules 111, 112 provides great flexibility in configuring both the tape drive units as well as configuring a plurality of library modules in a juxtaposed arrangement.

B. Tape Cartridge Storage Cells

Figure 4:
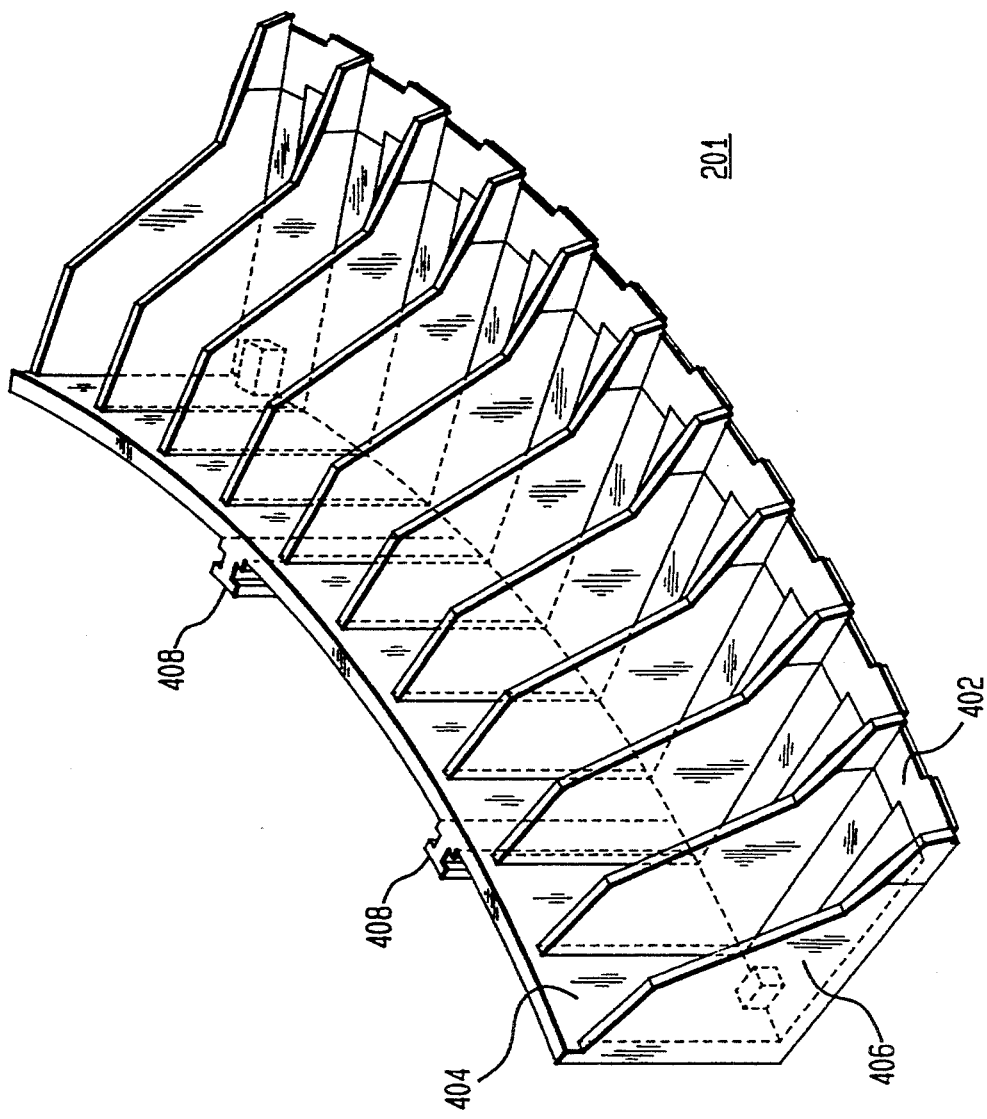
FIG. 4 is a perspective view of the tape cartridge storage cells.

Library module 111 contains two concentrically-arranged cylindrical arrays of tape cartridge storage cells. Referring to FIG. 4, an array 201 of magnetic tape cartridge storage cells is illustrated. The array 201 of tape cartridge storage cells has a radius of curvature adapted to be mounted in the internal cylindrical array 201 of library module 111. The tape cartridge storage cells on the external cylindrical array 202 are formed with an opposite curvature than those on the internal cylindrical array wall 201. All of the tape cartridge storage cells in the internal 201 and external 202 cylindrical arrays face each other so that the robot arm 230 can retrieve and replace the magnetic tape cartridges from either the interior 201 or the external 202 cylindrical array.

Each tape cartridge storage cell of arrays 201,202 consist of a bottom portion 402, a back portion 404, and intervening wall segments 406. Bottom portion 402 of the tape cartridge storage cells is angled downward, front to back, so that a magnetic tape cartridge placed in the tape cartridge storage cell tends to slide along bottom portion 402 into the tape cartridge storage cell. The wall segments 406 are adapted for access by the wrist and finger assemblies 240 of robot arm 230.

Attachment means such as tabs 408, formed at the rear of the arrays 201,202 can be used to suspend the arrays 201,202 from the wall segments 221, 231 of library module 111.

The arrangement of tape cartridge storage cells is illustrated more clearly in FIG. 3 wherein the external cylindrical array 202 is illustrated along the periphery of library module 111. The internal cylindrical array 201 of tape cartridge storage cells is illustrated as comprising two separate segments or regions of sell arrays. A cell array segment 302 of the internal cylindrical array 201 is mounted on the lower portion 308 of inner wall 204. An upper cell array segment 301 is mounted on the upper portion 306 of inner wall 204. In this fashion, an aperture is provided between the upper cell array segment 301 and lower cell array segment 302 of the internal cylindrical array 201 so that robot arm 230 can rotate about the center pivot axis A without interfering with any of the tape cartridge storage cells in the internal cylindrical array 201.

C. Tape Drive Unit

The magnetic tape cartridges retrieved from the individual tape cartridge storage cells are typically loaded onto media drive systems 141, 142 so that the data contained on the magnetic tape stored in the magnetic tape cartridge can be read by host computer 101. FIGS. 1 and 2 illustrate the placement of two media drive systems 141,142 on library module 111. The media drive systems are shown attached to two of the twelve exterior walls 202 of library module 111. Within each media drive system is located a plurality of individual tape drives 211,313 which function to read data from the magnetic tape cartridges loaded therein. FIG. 2 illustrates a single tape drive 211 and its associated stack loader 221. Tape drive 211 and stack loader 221 are located in the media drive system 141 to illustrate the orientation with respect to robot arm 230 and cylindrical arrays 201,202 of tape cartridge storage cells. A segment of the tape cartridge storage cells is removed from outer cylindrical array 202. This provides an aperture through which the front loading door opening of stack loader 221 protrudes. It protrudes a sufficient distance so as to be lined up with the surrounding storage cell arrays. The robot arm 230 can thereby load or unload a magnetic tape cartridge into stack loader 221 with the same or similar range of motion as the replacement of a magnetic tape cartridge into one of the individual storage cells in the tape cartridge storage cell arrays.

A side view of media drive system 141 is shown in FIG. 3 wherein two of the tape drives 211, 313 and their associated stack loaders 221,320 are shown stacked one above the other in a vertical alignment within media drive system 141 illustrated in FIG. 2. The orientation of the stack loaders 221, 320 and their respective tape drives 211,313 is such that a magnetic tape cartridge is placed into the stack loader on an angle similar to that of the individual tape cartridge storage cells. The only difference is that the stack loaders 221,320 require a horizontal loading of the magnetic tape cartridge while the tape cartridge storage cells store the magnetic tape cartridges in a vertical alignment. Thus the robot arm 230 in retrieving a magnetic tape cartridge from an individual tape cartridge storage cell and loading it into a media drive system 141 must rotate the magnetic tape cartridge through a 90° angle for proper orientation for loading into the tape drives 211, 313.

D. Robotic Arm Assembly

FIGS. 2, 3 and 5 illustrate a top view, side view, and perspective view of the robot arm assembly 230 of library module 111. Robot arm assembly 230 consists of a plurality of cooperating mechanisms which provide a moveable arm for retrieving magnetic tape cartridges from their individual storage cells. The robot arm assembly 230 consists of a theta arm 321 rotatably mounted on a support column 322 which is attached to the floor plates 312 of library module 111. The robot arm assembly 230 includes a Z-mechanism 323 attached to the end of theta arm 321 remote from support column 322. The Z-mechanism 323 has coupled thereto a wrist and finger assembly 240 which performs the magnetic tape cartridge retrieval and replace functions with the storage cells and stack loaders. The Z-mechanism 323 provides a vertical range of motion for the wrist and finger assembly 230 to access various vertical levels (rows) of the tape cartridge storage cell arrays. Theta arm 321 locates the Z-mechanism 323 and its associated wrist and finger assembly 240 in the proper location (column) to access the tape cartridge storage cells. The robot arm support column 322 includes a motor (not shown) which causes theta arm 321 of the robot arm assembly 230 to rotate about the pivot point A of the robot arm assembly 230 so that the robot arm assembly 230 can access all of the tape cartridge storage cells which are located in a circular array about the pivot point A. Thus, the elements in the robot arm assembly 230 cooperatively operate to access each and every storage cell in the entire library module 111. The servo motors (not shown) controlling each of the various ranges of motion associated with elements in the robot arm assembly 230 are all controlled by library control unit 122 connected to library module 111. The robot arm assembly 230 is capable of accessing each of the approximately 6,000 tape cartridge storage cells in library module 111.

Figure 6:
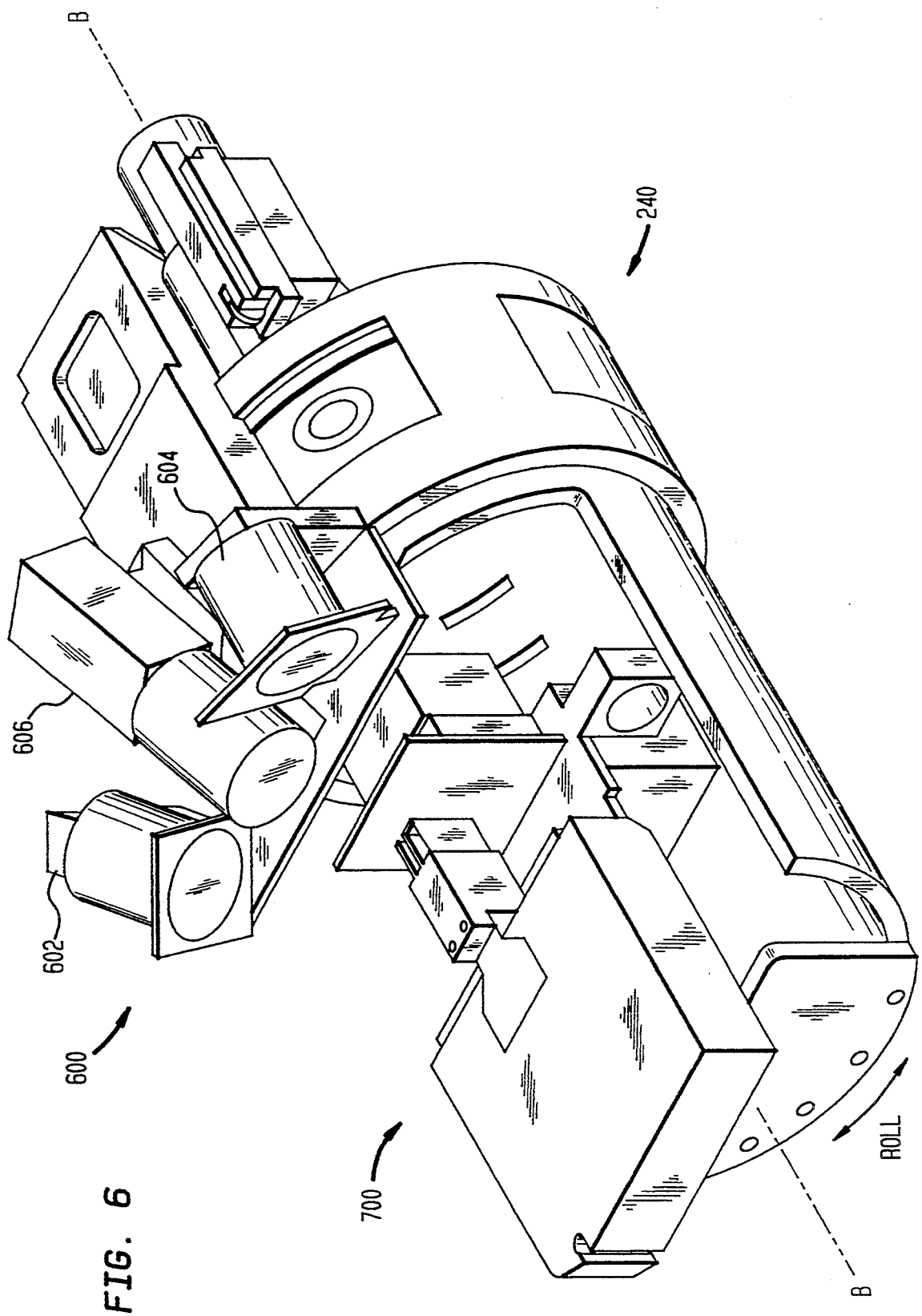
FIG. 6 is a perspective view of the robotic arm wrist and finger assembly.

FIG. 6 illustrates the wrist and finger assembly 240 that is located at the end of theta arm 321. The wrist and finger assembly 240 consists of a plurality of mechanisms that perform the roll and reach functions for the robot arm assembly 230. The magnetic tape cartridge can be rotated through a full 360 degree rotation about the pick-and-place axis B by a roll mechanism which implements the wrist function. The magnetic tape cartridge may also be rotated about the Z-axis to access the inner cell array 201 and outer cell array 202 as shown in FIG. 5.

A vision system 600 is located on top of the wrist and finger assembly 240 and is focused at a predetermined distance in front of the wrist and finger assembly 240. The point of focus of vision element 606 coincides with the position of a machine readable label on the end of the magnetic tape cartridge stored in the magnetic tape cartridge storage cell. In order to enable vision element 606 to read the label on the magnetic tape cartridge, a source of illumination is provided. The source of illumination consists of a pair of lamps 602, 604 arranged one on either side of the vision element 606 and aligned in substantially the same orientation as vision element 606. The lamps 602, 604 are directed so that the light beams emanating from these two lamps cross at a point in the line of sight of the vision elements 606, which point coincides with the location of the label on the end of the magnetic tape cartridge.

The two lamps 602, 604 serve to illuminate the label on the magnetic tape cartridge sufficiently so that vision element 606 can accurately read the machine readable characters on the label. The vision system 600 is also used for the purpose of calibrating the alignment of telescopic pick-and-place mechanism 700 and the tape cartridge storage cells. A calibration system used in conjunction with the present invention is described in U.S. Pat. No. 4,908,777 to Wolfe, herein incorporated by reference in its entirety. Another calibration system used in conjunction with the present invention is described in U.S. Pat. No. 5,034,904 to Moy, herein incorporated by reference in its entirety.

III. Telescopic Pick-And-Place Mechanism

Referring to FIGS. 7-11, the telescopic pick-and-place robotic mechanism ("pick-and-place mechanism") 700 of the present invention is illustrated. The pick-and-place mechanism 700 is designed to extend from the wrist and finger assembly 240 to reach, grasp, and retrieve a magnetic tape cartridge stored in a tape cartridge storage cell, tape drive, or other device, grasp. Pick-and-place mechanism 700 also performs the reverse function of depositing a magnetic tape cartridge into the storage cell, tape reading device, etc.

As will be explained in detail below, and would be apparent to a person skilled in the relevant art, pick-and-place mechanism 700 may be used with any type of robotic arm assembly required to perform retrieval/replacement functions. Pick-and-place mechanism 700 may also be used in any automated library system other than the ACS system manufactured by Storage Technology Corporation and described above. Also, implementation of the pick-and-place mechanism 700 to retrieve or replace objects other than magnetic tape cartridges would also be apparent to one skilled in the relevant art. This includes other types of data storage media volumes as well as objects unrelated to data storage.

A. Telescopic Plates

Figure 7:
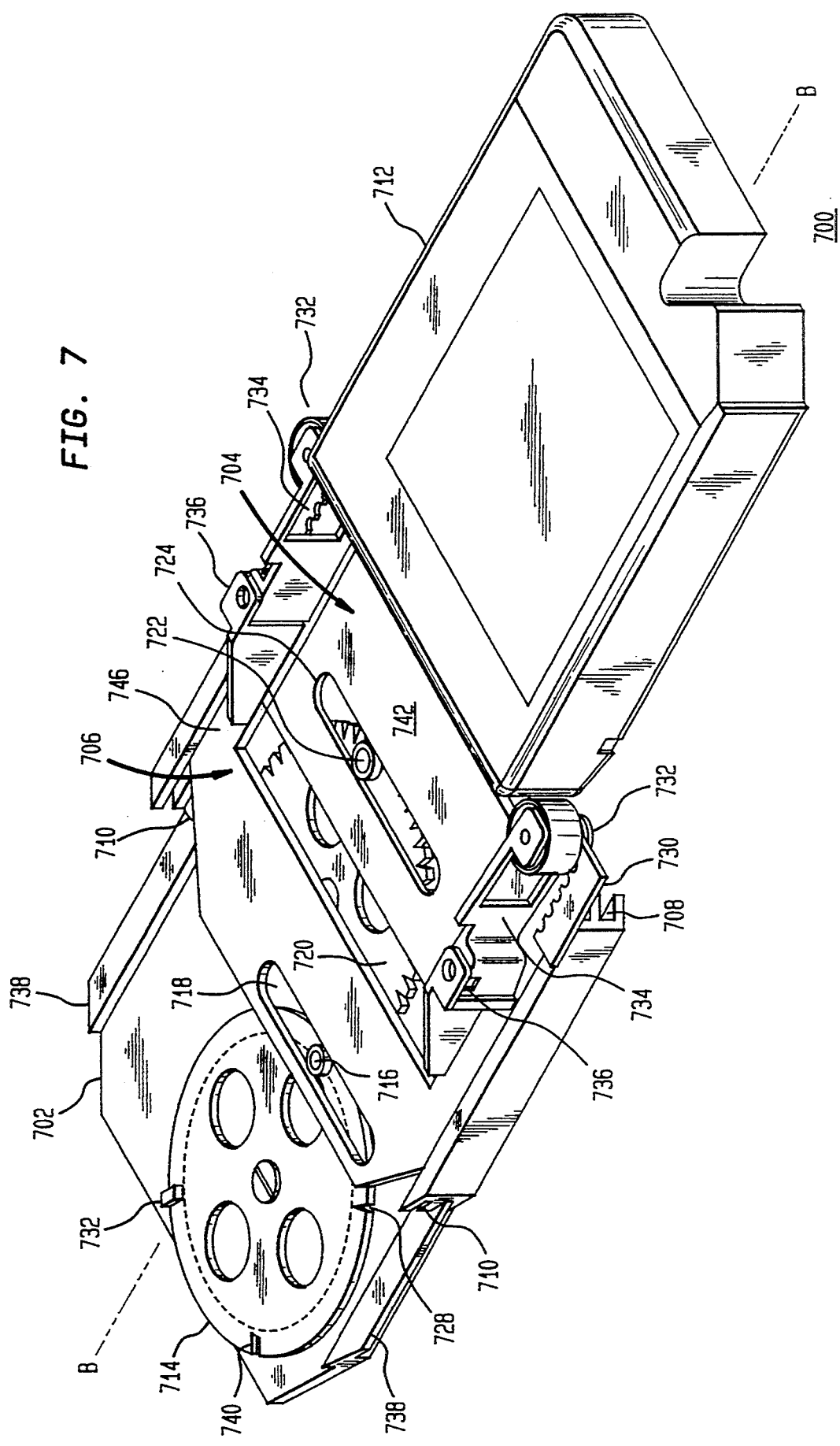
FIG. 7 is an isometric view of the telescopic pick-and-place robotic mechanism of the present invention in its fully extended position.
Figure 8:
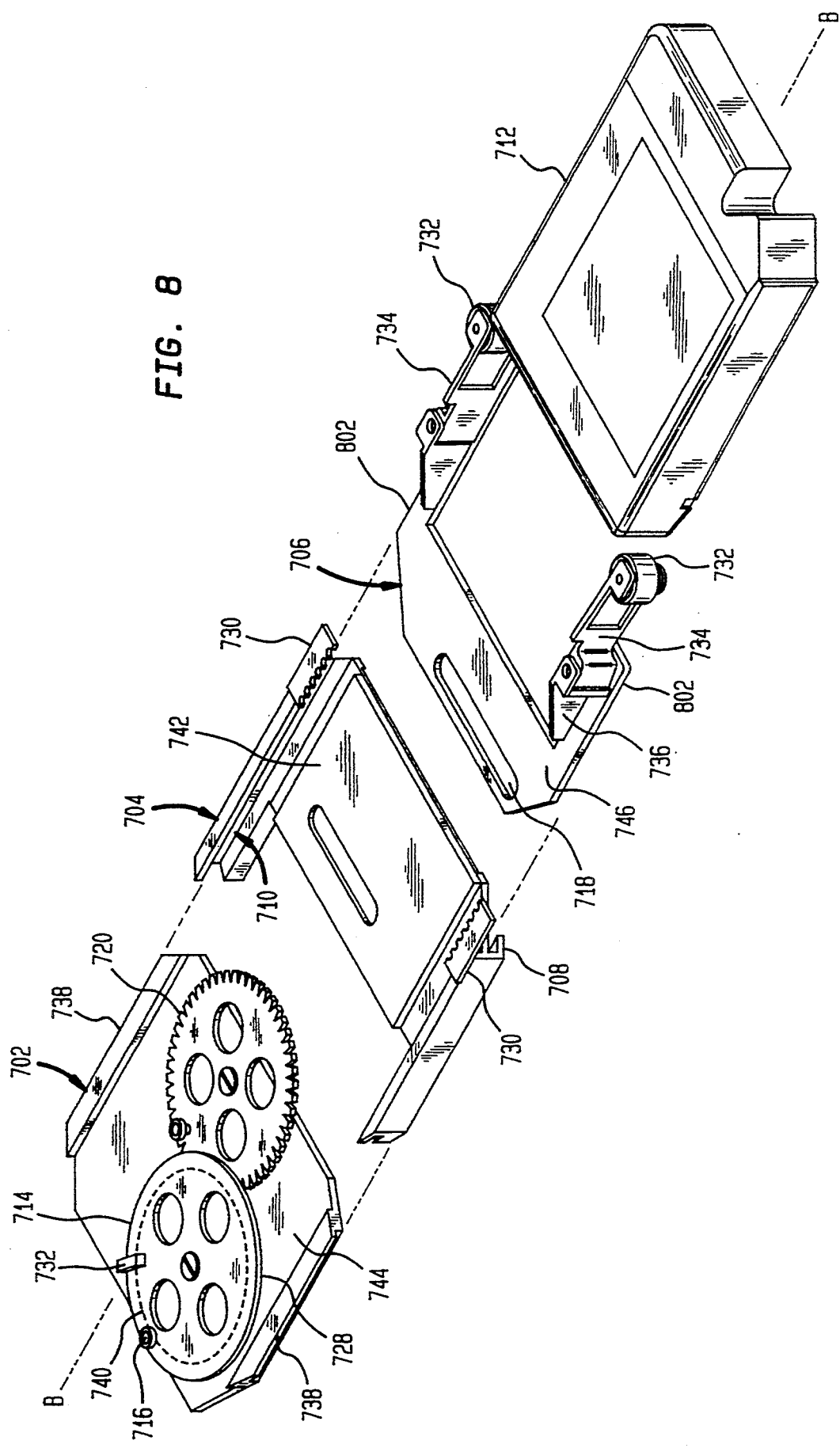
FIG. 8 is an exploded view of the pick-and-place mechanism.

FIG. 7 illustrates the pick-and-place mechanism 700 of the present invention in its fully extended position. FIG. 8 illustrates an exploded view of the pick-and-place mechanism 700. The preferred embodiment of the present invention is comprised of three plates of approximately equivalent size. The plates are the base plate 702, intermediate slider plate 704, and main slider plate 706.

The lowest plate, base plate 702, is the plate by which pick-and-place mechanism 700 is attached to the wrist and finger assembly 240. The base plate 702 does not move relative to the wrist and finger assembly 240 during the operation of pick-and-place mechanism 700. The base plate 702 behaves as a stationary base from which the remaining pick-and-place mechanism assembly operates. The base, however, does not necessarily have to be a plate similar to the slider plates 704,706. The base may take forms other than base plate 702 which meet the needs of a particular application. Base plate 702 has rails 738 and access holes (not shown), both of which are described in detail below.

Intermediate slider plate 704 has base plate tracks 708 designed to accept the base plate rails 738 of base plate 702. Base plate tracks 708 restrict the travel of the intermediate slider plate 704 relative to base plate 702 to movement along pick-and-place axis B in FIG. 7. The intermediate slider plate 704 also has main slider plate tracks 710 designed to accept the main slider plate rails 802 (see FIG. 8) of main slider plate 706. The intermediate slider plate tracks 7 10 work in conjunction with the main slider plate rails 802 to restrict the travel of the main slider plate 706 relative to the intermediate slider plate 704 to movement along pick-and-place axis A.

The intermediate slider plate 704 and the main slider plate 706 extend and retract relative to the position of base plate 702, forming a telescopic extension wherein each of the plates 702, 704, 706 forms a section of the telescopic pick-and-place mechanism 700. As shown, in the preferred embodiment of the present invention, a rail and track system is used to achieve the telescopic movement of the plates relative to each other to restrict that movement to a single axis. However, implementation of other types of linear sliding mechanisms which provide the same single-axis limitation of relative movement would be apparent to a person of ordinary skill in the relevant art. For example, roller bearings in a slider configuration may be used to achieve this same single-axis movement. In addition, the rail and track system of the present invention may be implemented in a different fashion than that described above and shown in FIGS. 7 and 8. For example, base plate 702 may contain tracks rather than rails 738 and intermediate slider plate could contain rails rather than tracks 708. As a result, plates 702, 704, and 706 may contain any combination of rail and tracks as necessary to optimize the design of a particular implementation.

Figure 9:
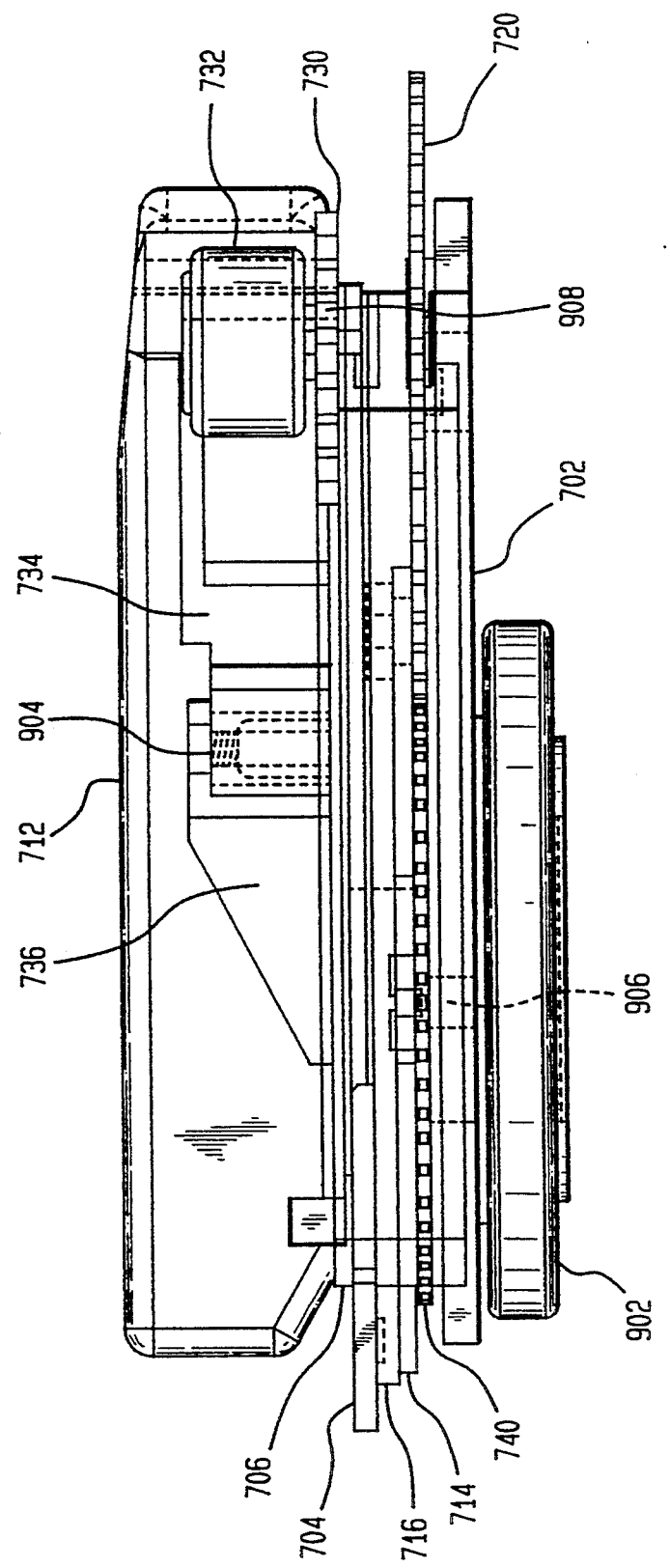
FIG. 9 is a cross-sectional side view of the pick-and-place mechanism in its fully retracted position.
Figure 10:
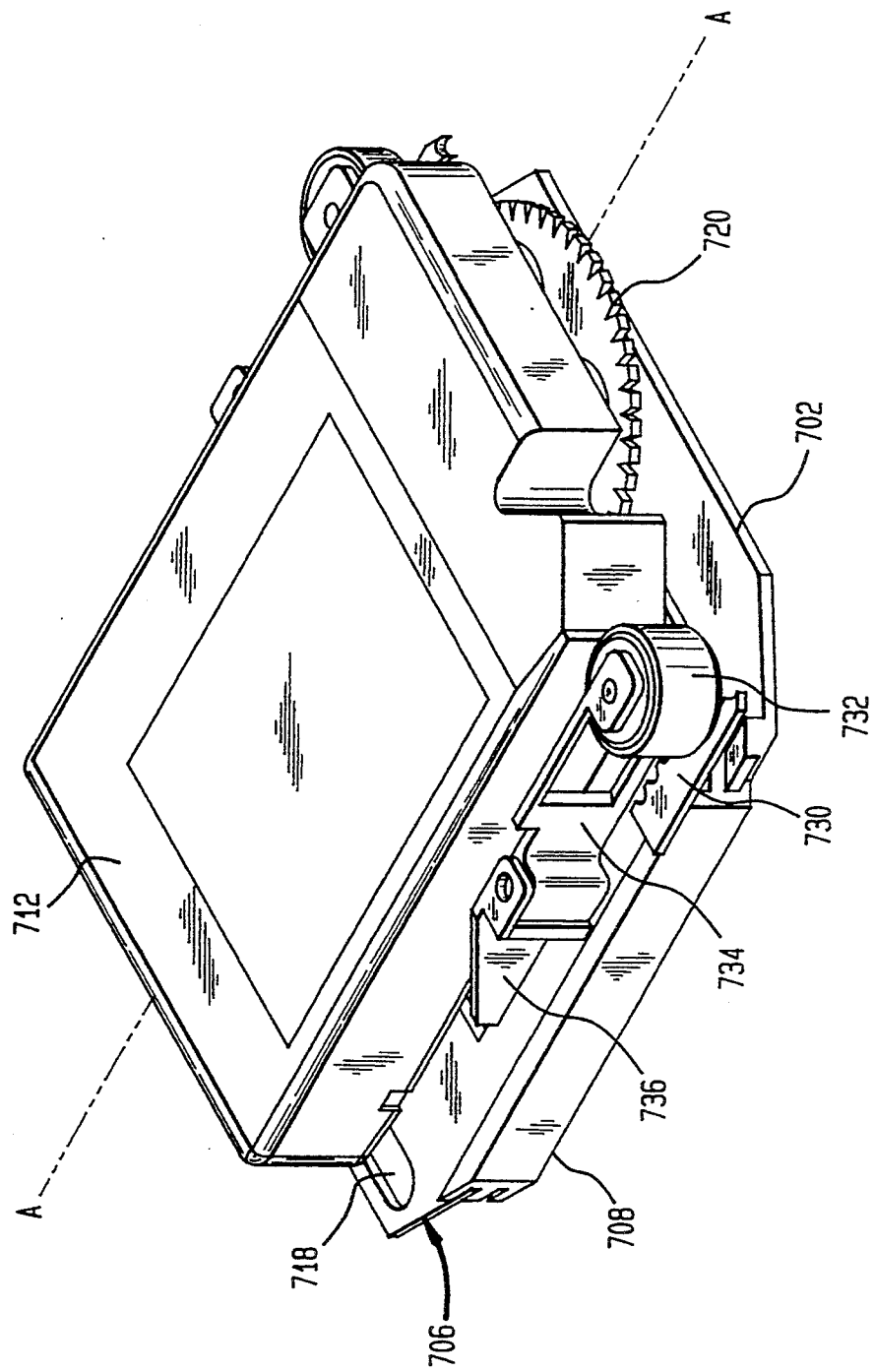
FIG. 10 is an isometric side view of the pick-and-place mechanism in the fully retracted position.
Figure 11:
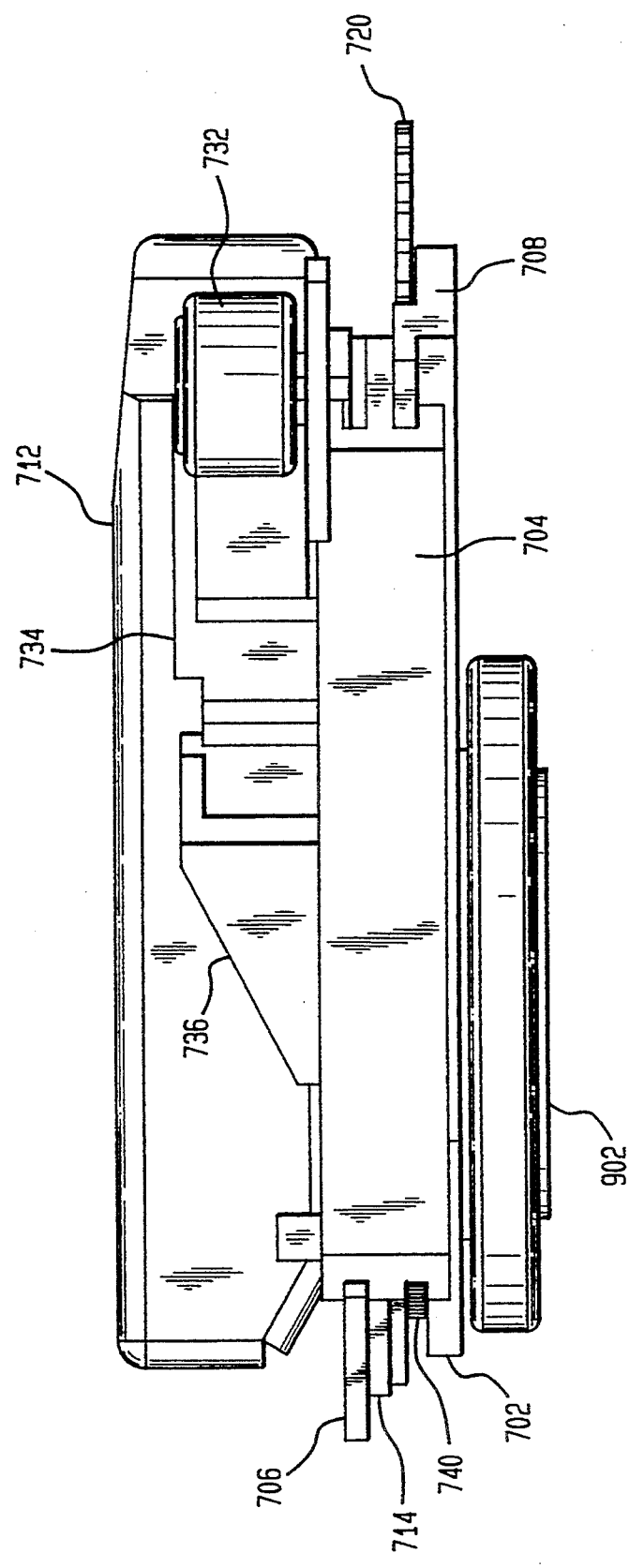
FIG. 11 is a side perspective view of the pick-and-place mechanism in its fully retracted position.

Referring to FIGS. 9-11, various views of pick-and-place mechanism 700 in the fully retracted position are illustrated. When pick-and-place mechanism 700 is in the fully retracted position, the intermediate slider plate 704 and main slider plate 706 are positioned over the base plate 702. Since each of these plates is approximately the same size as the magnetic tape cartridge 712, the size of the fully retracted pick-and-place mechanism 700 is approximately equal to the size of the magnetic tape cartridge 712.

In order to achieve this reduced size, the intermediate slider plate 704 and the base plate 702 must be designed to enable the surface 742 of intermediate slider plate 704 to travel over the cams and gears (discussed below) attached to base plate 702. In the preferred embodiment of the present invention, base plate rails 738 are raised above the surface 744 of base plate 702. Since the base plate rails 738 travel in base plate tracks 708 of intermediate slider plate 704, this places the base plate surface 744 in a lower position relative to the intermediate slider plate surface 742.

As shown in FIG. 7, the intermediate slider plate surface 742 extends further from the base plate 702 than the main slider plate surface 746. As a result, the intermediate slider plate surface 742 comes into contact with and supports the magnetic tape cartridge 712 when the magnetic tape cartridge 712 is placed in the pick-and-place mechanism 700. The intermediate slider plate surface 742 is raised to be co-planar with the main slider plate surface 746. As a result, both the main slider plate surface 746 and the intermediate slider plate surface 742 work together to support the magnetic tape cartridge 712 when the pick-and-place mechanism 700 is in a substantially extended position.

B. Telescopic Plate Control

The intermediate slider plate 704 travels in the pick-and-place axis A using the rail and track method described above. Intermediate slider plate 704 extends and retracts based on the rotational movement of the intermediate slider plate drive gear 720. Intermediate slider plate drive gear 720 is mounted on the top surface 744 of base plate 702 in a manner that enables intermediate slider plate drive gear 720 to rotate in a plane parallel to the base plates surface 744. Intermediate slider plate drive gear 720 rotates freely on base plate 702 under the control of a drive mechanism (not shown) discussed below. An intermediate slider plate cam follower 722 is mounted on the top surface of the intermediate slider plate drive gear 720. This intermediate slider plate cam follower 722 travels in a rotational manner as the intermediate slider plate drive gear 720 rotates. The intermediate slider plate 704 has an intermediate slider plate cam follower track 724 configured to accept the intermediate slider plate cam follower 722.

The height of the intermediate slider plate cam follower is determined by the distance between the base plate surface 744 and the intermediate slider plate surface 742. As the intermediate slider plate drive gear 720 rotates, the intermediate slider plate cam follower 722 travels in the intermediate slider plate cam follower track 724, causing intermediate slider plate 704 to travel along the pick-and-place axis relative to the base plate 702. The intermediate slider plate cam follower track 724 is positioned on the intermediate slider plate 704 and is of the necessary length, such that the intermediate slider plate cam follower track 724 does not inhibit the movement of the intermediate slider plate cam follower 722 as the intermediate slider plate cam follower 722 rotates a complete 360°.

The main slider plate 706 also travels in the pick-and-place axis A using the rail and track method described above. Main slider plate 706 extends and retracts based on the rotational movement of the main slider plate drive cam 714. Main slider plate drive cam 714 is mounted on the top surface 744 of base plate 702 in such a manner that enables main slider plate drive cam 714 to rotate in a plane parallel to the base plate surface 744. Main slider plate drive cam 714 rotates freely on base plate 702 under the control of a drive mechanism (not shown) discussed below. A main slider plate cam follower 716 is mounted on the top surface of the main slider plate drive cam 714. This main slider plate cam follower 716 travels in a rotational manner as the main slider plate drive cam 714 rotates. The main slider plate 706 has a main slider plate cam follower track 718 configured to loosely accept the main slider plate cam follower 716.

The height of main slider plate cam follower 716 is determined by the distance between the base plate surface 744 and the main slider plate surface 746. As the main slider plate drive cam 714 rotates, the main slider plate cam follower 716 travels in the main slider plate cam follower track 718, causing main slider plate 706 to travel along the pick-and-place axis relative to the intermediate slider plate 704. The main slider plate cam follower track 718 is positioned on the main slider plate 706 and is of the necessary length such that the main slider plate cam follower track 718 does not inhibit the movement of the main slider plate cam follower 716 as the main slider plate cam follower 716 rotates a complete 360°.

C. Cam and Gear Control

Referring to FIGS. 9 and 11, a cross-sectional and perspective view of the pick-and-place mechanism 700 in its fully retracted position is illustrated. Servo motor 902 controls the extension and retraction of pick-and-place mechanism 700. Servo motor 902 is positioned beneath base plate 702. Servo motor 902 is coupled to, and controls, the rotation of the main slider plate drive cam 714 by drive shaft 906.

Drive shaft 906 extends from servo motor 902 through an access hole in the base plate surface 744 (not shown) and is fixedly attached to an intermediate drive gear 740. Drive shaft 906 is the means by which the servo motor 902 transfers a rotational force to the intermediate drive gear 740. Intermediate drive gear 740 has a smaller radius than main slider plate drive cam 714 and is positioned between the main slider plate drive cam 714 and the base plate surface 744. Intermediate slider plate drive gear 720 and intermediate drive gear 740 are positioned such that intermediate slider plate drive gear 720 is meshed with and controlled by intermediate drive gear 740. In the preferred embodiment of the present invention, servo motor 902 is used to control pick-and-place mechanism 700. However, as would be apparent to one skilled in the relevant art, any type of drive mechanism which provides the necessary rotational force for a given application may be used.

The servo motor 902 which controls the pick-and-place mechanism 700 is typically one of many servo systems on a given robot arm assembly. In the preferred embodiment of the present invention, pick-and-place mechanism 700 is controlled by the library control unit 122 which translates the control signals received from the library management unit 121 into servo control signals to regulate the operation of pick-and-place mechanism 700. However, as would be apparent to one of ordinary skill in the relevant art, pick-and-place mechanism 700 may be controlled by any type of servo driver circuit or computer based processor.

An optical sensor 732 is attached to the base plate surface 744 and is positioned above main slider plate drive cam 714. Main slider plate drive cam 714 has a slot 728 which is positioned such that optical sensor 732 detects the passage of slot 728 as the main slider plate drive gear 714 rotates. In the preferred embodiment of the present invention, optical sensor 732 and associated slot 728 are used to detect the position of the pick-and-place mechanism 700. However, implementation of any type of position detection system would be apparent to one of ordinary skill in the relevant art. For example, electrical contact switches may be used.

D. Cartridge Holding Mechanism

Main slider plate 706 has mounting pivots 736 for the left and right pinch roller arms 734. The pinch roller arms 734 hold the pinch rollers 732 which are used to drive an object such as magnetic tape cartridge 712 in and out of pick-and-place mechanism 700.

The pinch roller arms 734 also hold pinion gears 908 attached to the bottom of pinch rollers 732. Pinch rollers 732 and pinion gears 908 rotate freely in pinch roller arm 734. Pinion gears 908 mesh with rack gears 730 which are located on the intermediate slider plate 704. The pinion gears 908 and the rack gears 730 form a rack and pinion gear pair which operates to cause the motion of the magnetic tape cartridge 712 based on the relative position of main slider plate 706 and intermediate slider plate 704. The pinch roller pinion gears 908 are preloaded (forced) into the rack gears 730 by arm springs 904 to maintain gear mesh when the tape cartridge assembly 712 is not present between the pinch rollers 732. The rack gears 730 on intermediate slider plate 704 have gear teeth on two sides of its rectangular edge, the inner side and the front side. The angle between the inner side and the front side of rack gear 730 is rounded to form a continual sequence of gear teeth with no abrupt change in direction. In other words, the two sides of rack gear 730 which have gear teeth are ovular.

The spacing between the pinch rollers 732 and the resulting grip on the magnetic tape cartridge 712 is determined by the location of the pinion gears 908 on the rack gears 730. The pinion gears 908 maintain a constant pressure against rack gears 730 due to the presence of the pinch roller arm preload springs 904. When the main slider plate 706 reaches its fully extended position, the pinion gears 908 travel from the inner side to the front side of rack gears 730. The pinion gears maintain contact with the gear teeth of the rack gears 730 causing the pinch roller arms 734 to pivot on the mounting pivots 736, thereby separating pinch rollers 732 from each other.

When magnetic tape cartridge 712 is gripped by pinch rollers 732, the pinch rollers 732 cause the magnetic tape cartridge 712 to translate along the pick-and-place axis as the pinion gears 908 travel along rack gears 730. This feature of the present invention eliminates the need for an additional servo mechanism to drive the cartridge holding mechanism. This in turn reduces the size, weight, and complexity of the pick-and-place mechanism 700.

In the preferred embodiment of the present invention, the cartridge holding mechanism uses hinged pinch rollers controlled by rack and pinion gears. However, implementation of other types of robotic gripping mechanisms which are capable of performing the gripping, releasing, and translation functions in a manner which meets the needs of a particular application would be apparent to one skilled in the relevant art.

E. Design Considerations

There are a number of operational and design considerations which must be considered when adapting the pick-and-place mechanism 700 to a particular application. For example, the distance of travel of each slider plate 704, the point at which the pinch rollers 732 open to receive an object, the position of the object in pick-and-place mechanism 700, and the velocity at which the object may be retrieved must be considered.

The distance each slider plate travels, referred to as the stroke, is determined by the placement of the associated cam follower on its rotating cam or gear. As one of ordinary skill in the relevant art would know, the radius at which the cam follower is located on the cam or gear determines the amount of stroke of the associated slider plate. Particularly, the stroke of a slider plate is twice the radius of its associated cam follower. As a result, the stroke and movement of intermediate slider plate 704 and main slider plate 706 may be different.

The relative rotational angle between the main slider plate cam follower 716 and the intermediate slider plate cam follower 722 is referred to as the lead angle. In the preferred embodiment of the present invention, the lead angle between the main slider plate cam follower 716 and the intermediate slider plate cam follower 722 is 9°. That is, when the intermediate slider plate 704 and the intermediate slider plate cam follower 722 is in the 0° position, the main slider plate cam follower 716 is in the 9° position in a clockwise direction. This 9° angular displacement determines the relative position of the pinion gears 908 on the rack gears 730 for a given relative position of intermediate slider plate 704 and main slider plate 706. This enables the designer to determine at which point in the extension and retraction of pick-and-place mechanism 700 the pinch rollers 732 will open to receive or close to grip the magnetic tape cartridge 712.

The position of the magnetic tape cartridge 712 and the velocity of its translation are determined by the displacement angle described above, the gear ratio of the pinch roller pinion gears 908 and rack gears 730, and the characteristics of the servo motor 902.

F. Pick-and-Place Mechanism Operation

A pick stroke (to retrieve an object) or a place stroke (to replace an object) is achieved by rotation of the servo motor 902 in the proper direction. Clockwise rotation of the servo motor 902 (as viewed from the top) will accomplish a pick stroke. In the preferred embodiment of the present invention, a 180° clockwise turn of the servo motor 902 will cause the main slider plate 706 to travel along main slider plate tracks 710 and extend away from intermediate slider plate 704. Simultaneously, the intermediate slider plate 704 will travel along rails 738 and extend away from base plate 702. As the main slider plate 706 travels along main slider plate tracks 710, the pinion gears 908 travel along the rack gears 730. As the pinion gears 908 travel along the rack gear 730, the pinch rollers 732 extend out and away from the robotic pick-and-place mechanism 700. At the point at which the pinch rollers 732 are fully extended outwards around the magnetic tape cartridge 712, the intermediate slider plate 704 and main slider plate 706 are substantially near the end of their stroke, and their associated cam followers are at an angular displacement of approximately 180° from their starting positions. As the servo motor 902 rotates an additional 180°, the pinch rollers 908 close onto the magnetic tape cartridge 712 as the pinion gears 908 travel from the front side to the inner side of rack gears 730. As the pick-and-place mechanism 700 continues to retract, the pinch rollers 732 pull the magnetic tape cartridge 712 back onto the intermediate slider plate surface 742. In this manner, the pinch roller 732 and intermediate slider plate 704 work together to achieve the necessary translation of magnetic tape cartridge 712 on to pick-and-place mechanism 700.

During a place stroke, servo motor 902 rotates in a counterclockwise direction causing the intermediate slider plate 704 and main slider plate 706 to push the object out of the pick-and-place mechanism 700 and into a remote position. As the servo motor 902 rotates, the pinion gears 908 rotate against the rack gears 730 on the intermediate slider plates 704, translating the magnetic tape cartridge 712 out of the pick-and-place mechanism 700. At the same time, intermediate slider plate 704 is extending away from base plate 702 and assisting in the translation of the magnetic tape cartridge 712. Eventually, the pinion gears 908 rotate from the inner side to the front side of rack gears 730, thereby opening outwards and releasing the magnetic tape cartridge 712.

As the servo motor 902 continues to rotate in the counterclockwise direction, the intermediate slider plate 704 and main slider plate 706 retract towards the base plate 702. Simultaneously, the pinion gears 908 travel back along the inner side of rack gears 730, closing the pinch rollers 732. At the end of the place stroke, the pick-and-place mechanism 700 is again in its fully retracted position.

In the preferred embodiment of the present invention, three plates have been used, of which two move relative motion to the third. However, more or less plates may be used depending on the particular application in which the pick-and-place mechanism 700 would be used. Since each slider plate has an associated gear or cam coupled to the base plate 702, the number of plates which may be added to pick-and-place mechanism 700 is limited by the size of the base plate 702 and the gears and cams which are coupled to it. These in turn will determine the amount of stroke which will be achieved by the slider plates 702, 704 as described above, the stroke of a given slider plate is limited by the radius of travel of its associated cam follower.

While various embodiments of the present invention have been described above, it should be understood that they have been presented by way of example, and not limitation. Thus, the breadth and scope of the present invention should not be limited by any of the above-described exemplary embodiments, which should be defined only in accordance with the following claims and their equivalence.

What is claimed is:

1. A telescopic pick and place robotic apparatus, comprising:
   a base;
   a slider plate having first and second major faces;
   coupling means for coupling said slider plate to said base and for allowing said slider plate to telescopically extend and retract relative to said base along an axis, said axis being substantially parallel to said first and second major faces;
   gripper means, mounted on said slider plate, for selectively grasping and translating an object along said axis onto and off of said first major face of said slider plate, including,
   a first rack and pinion gear pair, said first rack gear coupled to said base and said first pinion gear coupled to said slider plate,
   a first pinch roller coupled to said slider plate by a first spring-loaded arm and rotatably driven by said first pinion gear,
   a second rack and pinion gear pair, said second rack gear coupled to said base and said second pinion gear coupled to said slider plate, and
   a second pinch roller coupled to said slider plate by a second spring-loaded arm and rotatably driven by said second pinion gear,
   wherein said first and second pinch rollers are rotated respectively by said first rack and pinion gear pair and said second rack and pinion gear pair when said slider plate is translated relative to said base along said axis; and
   translating means for translating said slider plate along said axis.

2. The apparatus of claim 1, wherein said coupling means comprises a rail and track assembly.

3. The apparatus of claim 2, wherein said translating means comprises:
   driver means coupled to said base for producing a rotational force; and
   crank and slider means for converting said rotational force to a linear force to translate said slider plate along said axis.

4. The apparatus of claim 3, wherein said crank and slider means comprises:
   cam means coupled to said base and driven by said driver means;
   a cam follower connected to said cam means; and
   a cam follower track in said slider plate, configured to receive said cam follower.

5. The apparatus of claim 4, further comprising:
   control means for controlling operation of said driver means.

6. The apparatus of claim 5, further comprising:
   position detection means for detecting a relative position of said slider plate with respect to said base and for producing a signal indicating said position.

7. The apparatus of claim 6, wherein said driver means comprises a servo motor.

8. A telescopic pick and place robotic apparatus, comprising:
   a base;
   a plurality of slider plates, each having first and second major faces;
   coupling means for coupling each of said slider plates to said base and for allowing said slider plates to telescopically extend and retract relative adjacent slider plates and to said base along an axis, said axis being substantially parallel to said first and second major faces;
   gripper means, mounted on at least one of said slider plates, for selectively grasping and translating an object along said axis onto and off at least one of said slider plates; and
   translating means for translating said plurality of slider plates along said axis including,
   driver means coupled to said base for producing a rotational force, and
   crank and slider means for converting said rotational force to a plurality of linear forces, each of said linear forces to translate a respective one of said plurality of slider plates along said axis, said crank and slider means having,
   plurality of cam means coupled to said base and driven by said driver means
   a plurality of cam followers connected to each of said plurality of cam means, and
   a plurality of cam follower tracks, each of said plurality of cam follower track in a respective one of said plurality of slider plates and configured to receive a respective one of said plurality of cam followers.

9. The apparatus of claim 8, wherein said coupling means comprises a rail and track assembly.

10. The apparatus of claim 9, wherein said gripper means comprises:
    a first rack and pinion gear pair, said first rack gear coupled to a first slider plate and said first pinion gear coupled to a second slider plate;
    a first pinch roller coupled to said second slider plate by a first spring-loaded arm and rotatably driven by said first pinion gear;
    a second rack and pinion gear pair, said second rack gear coupled to said first slider plate and said second pinion gear coupled to said second slider plate; and
    a second pinch roller coupled to said second slider plate by a second spring-loaded arm and rotatably driven by said second pinion gear;
    wherein said first and second pinch rollers are rotated respectively by said first rack and pinion gear pair and said second rack and pinion gear pair when said second slider plate is translated relative to said first slider plate along said axis.

11. The apparatus of claim 10, further comprising:
    control means for controlling operation of said driver means.

12. The apparatus of claim 11, further comprising:
    position detection means for detecting a relative position of said plurality of slider plates with respect to said base and for producing a signal indicating said position.

13. The apparatus of claim 12, wherein said driver means comprises a servo motor.

14. A telescopic pick and place robotic apparatus, comprising:
    a base;
    a plurality of slider plates, each having first and second major faces;
    a rail and track assembly configured to couple each of said plurality of slider plates to said base and for allowing said slider plates to telescopically extend and retract relative to adjacent slider plates and to said base along an axis, said axis being substantially parallel to said first and second major faces;

gripper means for selectively grasping and translating an object along said axis onto and off at least one of said slider plates, said gripper means including, a first rack and pinion gear pair, said first rack gear coupled to a first slider plate and said first pinion gear coupled to a second slider plate, a first pinch roller coupled to said second slider plate by a first spring-loaded arm and rotatably driven by said first pinion gear, a second rack and pinion gear pair, said second rack gear coupled to said first slider plate and said second pinion gear coupled to said second slider plate, and a second pinch roller coupled to said second slider plate by a second spring-loaded arm and rotatably driven by said second pinion gear, wherein said first and second pinch rollers are rotated respectively by said first rack and pinion gear pair and said second rack and pinion gear pair when said second slider plate is translated relative to said first slider plate along said axis; and translating means for translating said plurality of slider plates along said axis, said translating means including, driver means coupled to said base for producing a rotational force, and crank and, slider means for converting said rotational force to a plurality of linear forces, each of said linear forces to translate a respective one of said plurality of slider plates along said axis.

* * * * *